(12) United States Patent
Benkley, III

(10) Patent No.: US 9,779,280 B2
(45) Date of Patent: Oct. 3, 2017

(54) FINGERPRINT SENSOR EMPLOYING AN INTEGRATED NOISE REJECTION STRUCTURE

(71) Applicant: IDEX ASA, Fornebu (NO)

(72) Inventor: Fred G. Benkley, III, Andover, MA (US)

(73) Assignee: IDEX ASA, Fornebu (NO)

( * ) Notice: Subject to any disclaimer, the term of this patent is extended or adjusted under 35 U.S.C. 154(b) by 0 days.

(21) Appl. No.: 14/582,359

(22) Filed: Dec. 24, 2014

(65) Prior Publication Data
US 2016/0188951 A1    Jun. 30, 2016

(51) Int. Cl.
*G06K 9/00*    (2006.01)

(52) U.S. Cl.
CPC ....... *G06K 9/00033* (2013.01); *G06K 9/0002* (2013.01)

(58) Field of Classification Search
CPC ............... H01L 2924/14; H01L 27/323; H01L 27/14678; G06K 9/0002; G06K 9/00013; G06K 19/07756; G06K 9/0008; G06F 3/044; G06F 3/0416; G06F 3/03547; G06F 2203/0338; G06F 3/046; H03K 17/955; H03K 17/962; G01R 27/2605; A61B 5/0531
See application file for complete search history.

(56) References Cited

U.S. PATENT DOCUMENTS

| | | | |
|---|---|---|---|
| 4,490,686 A | 12/1984 | Dimeff | |
| 4,736,073 A * | 4/1988 | Abernethy | G06F 3/046 |
| | | | 178/18.02 |

(Continued)

FOREIGN PATENT DOCUMENTS

| | | |
|---|---|---|
| EP | 0988614 B1 | 9/2004 |
| WO | WO 9858342 | 12/1998 |

(Continued)

OTHER PUBLICATIONS

International Search Report and Written Opinion issued in International Patent Application No. PCT/IB2015/059946, 14 pages (Mar. 21, 2016).

(Continued)

*Primary Examiner* — Edward Park
*Assistant Examiner* — Michael Vanchy, Jr.
(74) *Attorney, Agent, or Firm* — Rothwell, Figg, Ernst & Manbeck PC

(57) ABSTRACT

A sensor has drive lines and transverse pickup lines to define an electrode pair where each pickup line crosses a drive line. A reference pickup line is arranged parallel to the pickup lines and a compensation drive line is arranged parallel to the drive lines. A signal source provides a first signal to the drive lines and a second signal that is the inverse of the first signal to the compensation drive line. An amplifier has a first input connected to a pickup line, a second input connected to a reference pickup line, and a output indicative of an object in contact with the electrode pair(s). Each impedance between the compensation drive line and a pickup line, between the reference pickup line and a reference drive line, and between the compensation drive line and the reference pickup line is equal to the impedance at the electrode pair when no object is contact with the electrode pair.

46 Claims, 9 Drawing Sheets

(56) References Cited

U.S. PATENT DOCUMENTS

| | | |
|---|---|---|
| 5,861,875 A | 1/1999 | Gerpheide |
| 5,963,679 A | 10/1999 | Setlak |
| 6,069,970 A | 5/2000 | Salatino et al. |
| 6,459,424 B1 | 10/2002 | Resman |
| 7,251,351 B2 | 7/2007 | Mathiassen et al. |
| 7,504,833 B1 | 3/2009 | Seguine |
| 7,804,307 B1 | 9/2010 | Bokma et al. |
| 7,848,550 B2 | 12/2010 | Mathiassen et al. |
| 7,940,249 B2 | 5/2011 | Perreault |
| 8,040,142 B1 | 10/2011 | Bokma et al. |
| 8,115,497 B2 | 2/2012 | Gozzini |
| 8,125,441 B2 | 2/2012 | Li |
| 8,154,310 B1 | 4/2012 | Maharyta et al. |
| 8,248,084 B2 | 8/2012 | Bokma et al. |
| 8,358,142 B2 | 1/2013 | Maharyta |
| 8,421,890 B2 | 4/2013 | Benkley, III |
| 8,446,158 B1 | 5/2013 | Jansson |
| 8,482,536 B1 | 7/2013 | Young |
| 8,487,639 B1 | 7/2013 | Walsh et al. |
| 8,575,947 B1 | 11/2013 | Walsh et al. |
| 8,717,042 B1 | 5/2014 | Seguine |
| 8,791,792 B2 | 7/2014 | Benkley, III |
| 8,866,347 B2 | 10/2014 | Benkley, III |
| 8,866,500 B2 | 10/2014 | Kremin et al. |
| 9,542,588 B2 | 1/2017 | Kremin et al. |
| 2005/0156906 A1 | 7/2005 | Chiu et al. |
| 2006/0097991 A1 | 5/2006 | Hotelling et al. |
| 2011/0192657 A1 | 8/2011 | Chen et al. |
| 2012/0063173 A1 | 3/2012 | Fu et al. |
| 2012/0085822 A1 | 4/2012 | Setlak et al. |
| 2012/0134549 A1* | 5/2012 | Benkley, III ........... G01N 27/04 382/124 |
| 2012/0241904 A1* | 9/2012 | Wu ........................ H01L 27/08 257/531 |
| 2013/0177220 A1 | 7/2013 | Erhart et al. |
| 2013/0194071 A1 | 8/2013 | Sløgedal et al. |
| 2013/0265137 A1 | 10/2013 | Nelson et al. |
| 2013/0279769 A1 | 10/2013 | Benkley, III et al. |
| 2014/0241595 A1 | 8/2014 | Bernstein et al. |
| 2014/0361395 A1 | 12/2014 | Bhagavat et al. |
| 2015/0030217 A1 | 1/2015 | Wickboldt et al. |
| 2015/0036065 A1 | 2/2015 | Yousefpor et al. |
| 2016/0140376 A1 | 5/2016 | Kremin et al. |
| 2016/0148034 A1 | 5/2016 | Kremin et al. |

FOREIGN PATENT DOCUMENTS

| | | |
|---|---|---|
| WO | WO 0199036 A3 | 12/2001 |
| WO | WO 03049012 A2 | 6/2003 |
| WO | WO 2007011607 A1 | 1/2007 |
| WO | WO 2016081054 A1 | 5/2016 |
| WO | WO 2016085560 A1 | 6/2016 |

OTHER PUBLICATIONS

International Preliminary Report on Patentability issued in International Patent Application No. PCT/IB2015/059946, 11 pages (dated Jul. 6, 2017).

* cited by examiner

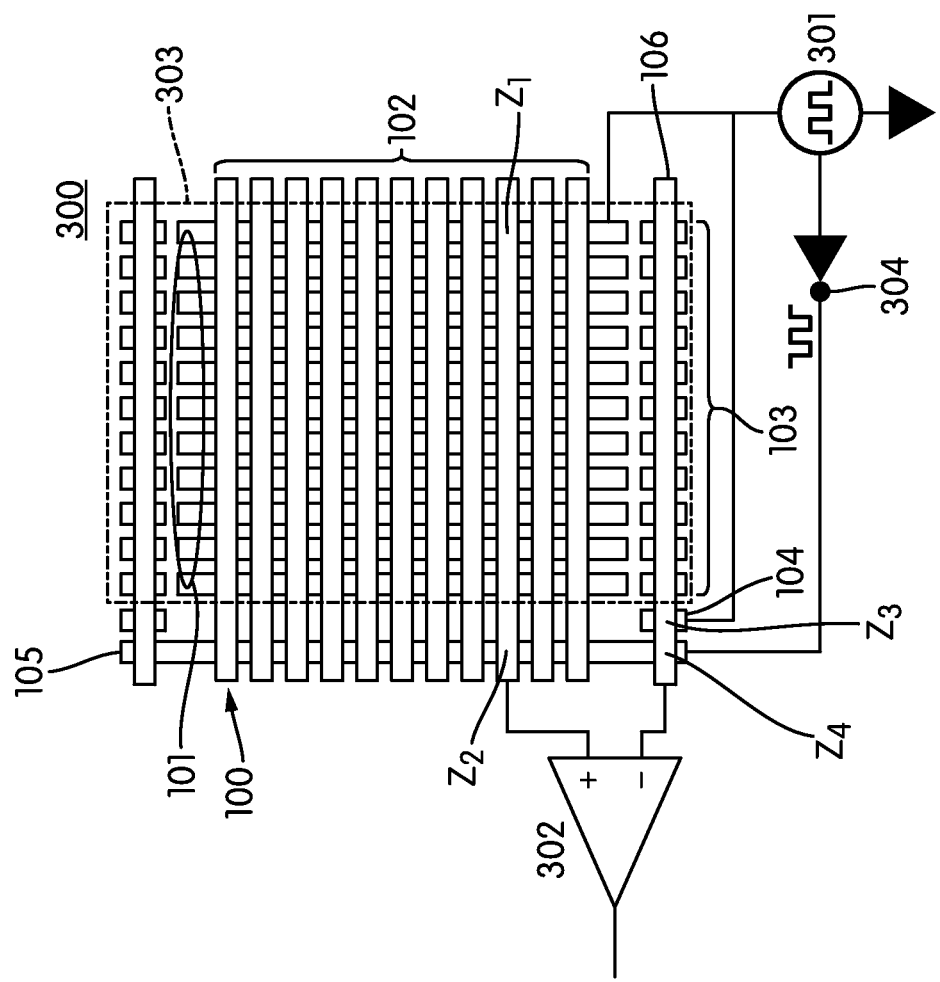
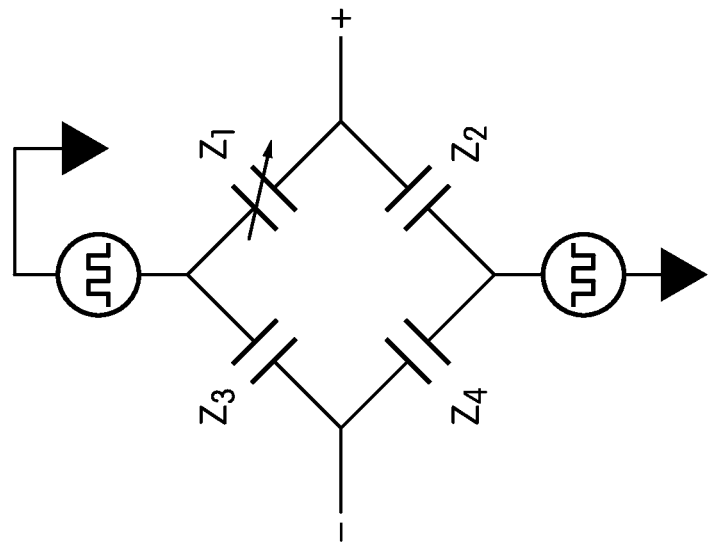
FIG. 3a
FIG. 3b

FINGERPRINT SENSOR EMPLOYING AN INTEGRATED NOISE REJECTION STRUCTURE

FIELD OF THE INVENTION

This invention relates to sensors for the electronic sensing of objects located near or about the sensor, such as epidermal ridge patterns commonly known as fingerprints.

BACKGROUND OF INVENTION

Finger print sensors comprising electrodes for measuring characteristics in a finger surface are well known. For example, EP0988614, U.S. Pat. No. 5,963,679, U.S. Pat. No. 6,069,970 and U.S. Pat. No. 8,421,890 describe sensors based on different impedance or capacitance measurement principles with strip-shaped or matrix sensors comprising a number of individual sensor elements.

It is in the nature of a fingerprint sensor that a finger will have to contact, or be in close proximity to, the fingerprint sensor for the sensor to be able to sense a fingerprint pattern. Ideally, the finger is considered to be grounded through the body. As a practical matter, however, the body functions like an antenna that picks up radiation or electronic noise from the surroundings. The electronic noise propagates through the body to the finger and the fingerprint sensor and interferes with signals being detected by the sensor. This human body interfering signal often has the same order of magnitude as the signal difference between a ridge and a valley that are being measured. In addition to radiated noise, power supply noise can be conducted into the sensor through the capacitive connection of the human body to a different ground potential than the sensor.

In addition to noise through the human body, sensor-to-sensor and intrasensor variations may arise due to differences in individual grid crossover junction etching, dielectric variations, and coating variations.

Current art fingerprint sensors typically attempt to reduce these interfering system noises through post detection filtering methods rather than employing advanced electronic sensing methods designed to mitigate these noise sources. There is therefore a need in the industry for an improved fingerprint sensor with that is specifically architected to improve the rejection of the typical conducted and radiated noise sources found in fingerprint sensors.

SUMMARY OF THE INVENTION

Aspects of the disclosure are embodied in a fingerprint sensor system comprising a plurality of substantially parallel drive lines, a plurality of substantially parallel pickup lines oriented transversely to the plurality of drive lines, an insulating layer separating the plurality of pickup lines from the plurality of drive lines, a plurality of electrode pairs, each electrode pair being defined at a location where a pickup line crosses a drive line, wherein each electrode pair has an impedance that is sensitive to an object contacting or in close proximity to the electrode pair, one or more reference pickup line(s) oriented substantially parallel with the plurality of pickup lines, one or more compensation drive line(s) oriented substantially parallel with the drive lines and crossing the pickup lines and the reference pickup line(s) to capacitively couple the compensation drive line(s) into the pickup lines and the reference pickup line(s), and a reference pickup drive line crossing the reference pickup line to capacitively couple the reference pickup line and the reference pickup drive line. Each electrode pair has a first impedance when no object is contacting or in close proximity to the electrode pair, and the drive lines, the pickup lines, the reference pickup line, the compensation drive line, and the reference pickup drive line are configured such that a second impedance between the compensation drive line and a crossing pickup line, a third impedance between the reference pickup line and a crossing reference pickup drive line, and a fourth impedance between the compensation drive line and the reference pickup line are substantially equal to the first impedance. A signal source is configured to provide a first signal to one of the drive lines and the reference pickup drive line and to provide a second signal to the compensation drive line. The second signal is a fixed reference amplitude phase inverted relative to the first signal. A differential amplifier has a first input, a second input, and an output. The first input is connected to a pickup line, the second input is connected to one or more of the reference pickup line(s), and the output of the differential amplifier is indicative of the presence of ridge and valley features of a finger contacting or in close proximity to one or more of the electrode pairs.

According to further aspects each of the drive lines, the compensation drive line, and the reference pickup drive line have a first width and each of the pickup lines and the reference pickup line have a second width, wherein the second width is different from the first width.

According to further aspects, the first width is twice the second width.

According to further aspects, the compensation drive line is located in a physical layer different from the drive lines.

According to further aspects, the compensation drive line is located within a conductive ground layer.

According to further aspects, the compensation drive line is located in a cutout in the conductive ground layer.

According to further aspects, the reference pickup drive line comprises a reference drive line that is physically separated from and parallel to the drive lines.

According to further aspects, the reference drive line is located in a physical layer different from the drive lines.

According to further aspects, the reference drive line is located in a conductive ground layer.

According to further aspects, the reference drive line is located within a cutout in the conductive ground layer.

According to further aspects, each reference pickup drive line comprises a portion of a drive line.

According to further aspects, the system comprises two reference pickup lines.

According to further aspects, each reference pickup line comprises a single strip of conductive material.

According to further aspects, the system further comprises a plurality of substantially parallel ground reference lines oriented substantially in-line with the plurality of drive lines and connected to ground, wherein each ground reference line crosses the reference pickup line.

According to further aspects, the ground reference lines are connected to ground by vias to a ground layer.

According to further aspects, the plurality of drive lines are oriented substantially perpendicular to the plurality of pickup lines.

According to further aspects, the compensation drive line is located outside a finger contact area defined by crossing drive lines and pickup lines.

According to further aspects, the reference pickup line is located within the finger contact area.

According to further aspects, the system further comprises a ground layer having at a first and a second cutout, wherein the compensation drive line is located within the first cutout and the reference pickup drive line is located within the second cutout, a second insulating layer separating the ground layer from the plurality of drive lines, an interconnect layer, a third insulating layer separating the interconnect layer from the ground layer, a plurality of pickup interconnect elements located in the interconnect layer and crossing the compensation drive line, and the pickup interconnect elements are connected to the plurality of pickup element by vias, wherein the crossing of the pickup interconnect elements and the compensation drive line provides the capacitive coupling of the pickup lines with the compensation drive line, a reference pickup interconnect element located in the interconnect layer and crossing the compensation drive line and the reference pickup drive line, and the reference pickup interconnect element is connected to the reference pickup line by a via, wherein the crossing of the reference pickup interconnect element and the compensation drive line provides the capacitive coupling of the reference pickup line with the compensation drive line, and the crossing of the reference pickup interconnect element and the reference pickup drive line provides the capacitive coupling of the reference pickup line with the reference pickup drive line.

According to further aspects, the first signal is an alternating RF signal having a predetermined frequency.

According to further aspects, the system further comprises an inductor connected between the first and second input of the differential amplifier, and an adjustable capacitor connected between the first and second input of the differential amplifier to provide a tunable bandpass filter having a center frequency tuned to the predetermined frequency of the first signal.

According to further aspects, the inductor is a center-tapped inductor.

According to further aspects, the center-tapped inductor comprises two substantially identical discrete inductors.

According to further aspects, the two substantially identical discrete inductors have a high inductance L, and the adjustable capacitor has a low capacitance C to provide a bandpass filter with a high Q factor.

Aspects of the disclosure are embodied in a fingerprint sensor system comprising: a plurality of substantially parallel drive lines, a plurality of substantially parallel pickup lines oriented transversely to the plurality of drive lines to capacitively couple each pickup line to a drive line at each location where a pickup line crosses a drive line, an insulating layer separating the plurality of pickup lines from the plurality of drive lines, a reference pickup line oriented substantially parallel with the pickup lines, a compensation drive line oriented substantially parallel with the drive lines and crossing the pickup lines and the reference pickup line to capacitively couple the compensation drive line with the pickup lines and the reference pickup line, a reference pickup drive line crossing the reference pickup line to capacitively couple the reference pickup line and the reference pickup drive line, a signal source configured to provide a first signal to one of the drive lines and the reference pickup drive line and to provide a second signal to the compensation drive line, where the second signal is the inverse of the first signal, and a differential amplifier having a first input, a second input, and an output. The first input is connected to a pickup line, thereby coupling (a) the first signal to the first input via the pickup line and capacitively-coupled a drive line and (b) the second signal to the first input via the pickup line and the capacitively-coupled compensation drive line. The second input is connected to the reference pickup line, thereby coupling (a) the first signal to the second input via reference pickup line and the capacitively-coupled reference pickup drive line and (b) the second signal to the second input via the reference pickup line and the capacitively-coupled compensation drive line. The output of the differential amplifier is substantially free of common mode noise.

According to further aspects, each location where a pickup line crosses a drive line defines an electrode pair, each electrode pair has an impedance that is sensitive to an object contacting or in close proximity to the electrode pair, and each electrode pair has a first impedance when no object is contacting or in close proximity to the electrode pair. The drive lines, the pickup lines, the reference pickup line, the compensation drive line, and the reference pickup drive line are configured such that a second impedance between the compensation drive line and a crossing pickup line, a third impedance between the reference pickup line and a crossing reference pickup drive line, and a fourth impedance between the compensation drive line and the reference pickup line are substantially equal to the first impedance.

According to further aspects, each of the drive lines, each of pickup lines, the reference pickup line, the compensation drive line, and the reference pickup drive line have a first width.

According to further aspects, each of the drive lines, the compensation drive line, and the reference pickup drive line have a first width, and each of the pickup lines and the reference pickup line have a second width that is different from the first width.

According to further aspects, the first width is twice the second width.

According to further aspects, the compensation drive line is located in a physical layer different from the drive lines.

According to further aspects, the compensation drive line is located within a conductive ground layer.

According to further aspects, the compensation drive line is located in a cutout in the conductive ground layer.

According to further aspects, the reference pickup drive line comprises a reference drive line that is physically separated from and parallel to the drive lines.

According to further aspects, the reference drive line is located in a physical layer different from the drive lines.

According to further aspects, the reference drive line is located in a conductive ground layer.

According to further aspects, the reference drive line is located within a cutout in the conductive ground layer.

According to further aspects, each reference pickup drive line comprises a portion of a drive line.

According to further aspects, the system comprises two reference pickup lines.

According to further aspects, each reference pickup line comprises a single strip of conductive material.

According to further aspects, the system comprises a plurality of substantially parallel ground reference lines oriented substantially in-line with the plurality of drive lines and connected to ground, wherein each ground reference line crosses the reference pickup line.

According to further aspects, the ground reference lines are connected to ground by vias to a ground layer.

According to further aspects, the plurality of drive lines are oriented substantially perpendicular to the plurality of pickup lines.

According to further aspects, the compensation drive line is located outside a finger contact area defined by crossing drive lines and pickup lines.

According to further aspects, the reference pickup line is located outside the finger contact area.

According to further aspects, the system comprises a ground layer having a first and a second cutout, wherein the compensation drive line is located within the first cutout and the reference pickup drive line is located within the second cutout, a second insulating layer separating the ground layer from the plurality of drive lines, an interconnect layer, a third insulating layer separating the interconnect layer from the ground layer, a plurality of pickup interconnect elements located in the interconnect layer and crossing the compensation drive line, wherein the pickup interconnect elements are connected to the plurality of pickup element by vias, and the crossing of the pickup interconnect elements and the compensation drive line provides the capacitive coupling of the pickup lines with the compensation drive line, a reference pickup interconnect element located in the interconnect layer and crossing the compensation drive line and the reference pickup drive line, wherein the reference pickup interconnect element is connected to the reference pickup line by a via, and the crossing of the reference pickup interconnect element and the compensation drive line provides the capacitive coupling of the reference pickup line with the compensation drive line, and the crossing of the reference pickup interconnect element and the reference pickup drive line provides the capacitive coupling of the reference pickup line with the reference pickup drive line.

Further aspects of the disclosure are embodied in a fingerprint sensor system, comprising a plurality of substantially parallel drive lines, a plurality of substantially parallel signal pickup lines oriented transversely to the plurality of drive lines and configured to be proximate to an object and to receive at least a portion of a first signal emitted by each of the drive lines, an insulating layer separating the plurality of signal pickup lines from the plurality of drive lines, a plurality of electrode pairs, each electrode pair being defined at a location where a signal pickup line crosses a drive line, wherein each electrode pair has an impedance that is sensitive to an object proximate to the signal pickup line of the electrode pair thereby affecting an amount of the first signal received by the signal pickup line of the electrode pair, one or more reference pickup line(s) configured to be proximate to an object that is also proximate to the signal pickup lines but is not configured to be impedance sensitive to the object, one or more compensation drive line(s) configured to inject a second signal into the signal pickup lines and the reference pickup line(s) without forming an electrode pair between the compensation drive line(s) and the reference pickup line(s) that is impedance sensitive with respect to an object proximate to the reference pickup line(s), wherein the second signal has a magnitude that is substantially equal to a magnitude of the first signal but has a phase that is different than a phase of the first signal, and a differential amplifier having a first input connected to one of the pickup lines, a second input connected to the one or more reference pickup line(s), and an output, wherein the second input provides a common mode noise reference for the first input so that the output of the differential amplifier is indicative of surface features of an object contacting or in close proximity to one or more of the electrode pairs.

Other features and characteristics of the present invention, as well as the methods of operation, functions of related elements of structure and the combination of parts will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present invention. In the drawings, common reference numbers indicate identical or functionally similar elements.

FIG. 3a illustrates an embodiment of a fingerprint sensor system according to an embodiment of the present invention.

FIG. 3b illustrates an electronic circuit for the measurement of an impedance-sensitive electrode pair according to an embodiment of the present invention.

DETAILED DESCRIPTION OF THE INVENTION

Figure 1:
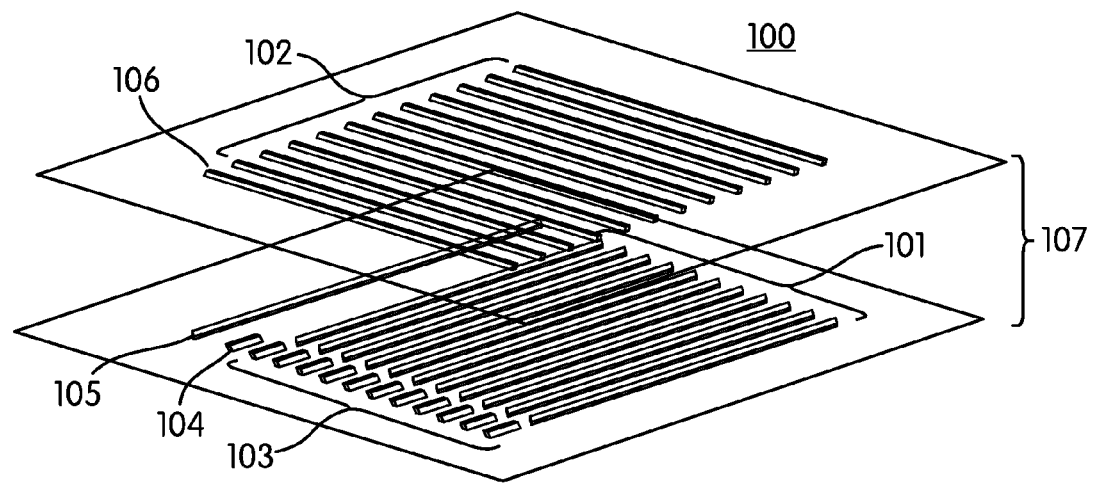
FIG. 1 illustrates a top perspective view of a fingerprint sensor according to an embodiment of the present invention.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the invention and are not intended to be limiting.

The present disclosure relates to an electronic sensor for detecting proximally located objects. In an embodiment, the sensor is a fingerprint sensor that detects surface features (e.g., ridges and valleys) of a finger placed on the electronic sensor. In an embodiment, the electronic sensor operates based on interaction between a pair of electrodes that include a drive element and a pickup element. The pickup element may be capacitively coupled to the drive element and may sense a signal that passes from the drive element to the pickup element. Features of a proximally located object can be detected based on whether the sensor detects a change in a signal being received at the pickup element.

In an embodiment, the electronic sensor forms a grid to detect surface features of a proximally located object at a plurality of locations. The grid includes a plurality of parallel drive lines, which are each connectable to a drive source, and includes a plurality of parallel pickup lines that are oriented transversely (e.g., perpendicularly) to the drive lines. The drive lines are separated from the pickup lines by an insulating (e.g., dielectric) layer. Each drive line may thus be capacitively coupled to a pickup line. In the embodiment, the drive lines can form one axis (e.g., X-axis) of the grid, while the pickup lines form another axis (e.g., Y-axis) of the grid. Each location where a drive line and a pickup line cross may form an impedance-sensitive electrode pair. This impedance-sensitive electrode pair may be treated as a pixel (e.g., an X-Y coordinate) at which a surface feature of the proximally located object is detected. The grid forms a plurality of pixels that can collectively be scanned to create a map of the surface feature of the proximally located object. For instance, the pixels of the grid can differentiate locations where there is a ridge of a fingertip touching the electronic sensor and locations where there is a valley of the fingerprint. The map can be used as a pattern to match with ridge/valley patterns stored in a database. Additional details of a fingerprint sensor with overlapping drive lines and pickup lines are discussed in more detail in U.S. Pat. No. 8,421,890, entitled "Electronic imager using an impedance sensor grid array and method of making," the content of which is incorporated by reference in its entirety.

FIG. 1 illustrates a portion of an exemplary fingerprint sensor structure 100. The sensor 100 includes a drive layer comprising a plurality of drive elements 101 and a pickup layer comprising a plurality of pickup elements 102. In one embodiment, the drive elements 101 may be formed as elongated, flat strips (i.e., width greater than thickness) of conductive material (e.g., copper, aluminum, gold) that are substantially parallel to each other and which may also be referred to as drive lines or drive plates. The pickup elements 102 may be formed as elongated, flat strips of conductive material (e.g., copper, aluminum, gold) that are substantially parallel to each other and which may also be referred to as pickup lines or pickup plates. An insulating layer 107 made of a dielectric material separates the drive lines 101 and the pickup lines 102. The drive elements 101 and the pickup elements 102 are oriented transversely to each other, and in one embodiment, are substantially perpendicular to each other, thereby forming an area of overlap between the drive lines 101 and the crossing pickup lines 102.

The sensor structure 100 further comprises at least one reference pickup element 106. In one embodiment, the reference pickup element 106 may be formed as an elongated, flat strip of conductive material (e.g., copper, aluminum, gold) that is substantially parallel with the pickup elements 102 and may also be referred to as a reference pickup line or reference pickup plate. In one embodiment, the reference pickup element 106 is positioned on one side of the plurality of pickup elements 102 as an end line. In another embodiment, a second reference pickup element may be positioned on an opposite side of the plurality of pickup elements 102. In a further alternate embodiment, a reference pickup element may be positioned between two adjacent pickup lines 102. In a still further alternate embodiment, the reference pickup line 106 is not a continuous strip, as shown in FIG. 1, but may comprise two or more segments arranged end-to-end (or overlapping) and parallel to the pickup lines 102, although the segments may not necessarily be collinear with each other.

The sensor structure 100 further comprises a compensation drive element 105 and a plurality of ground reference elements 103. In one embodiment, the compensation drive element 105 may be formed as an elongated, flat strip of conductive material (e.g., copper, aluminum, gold) that is substantially parallel with the drive elements 101 and may also be referred to as a compensation drive line or compensation drive plate. The compensation drive element 105 is oriented such that it crosses the pickup elements 102 and the reference pickup element 106 to thereby capacitively couple the compensation drive element 105 with the pickup elements 102 and the reference pickup element 106 and thus couple an inverted drive signal (described below) that is applied to the compensation drive element 105 to the pickup elements 102 and the reference pickup element 106. In one embodiment the compensation drive element 105 is located in the same physical layer as the drive elements 101. In yet another embodiment the compensation drive element 105 is positioned in another physical layer potentially shielded from the top sensing layer.

In an alternate embodiment, the sensor includes more than one compensation drive element.

The plurality of ground reference elements 103 may, in one embodiment, be formed as an elongated, flat strips of conductive material (e.g., copper, aluminum, gold) that are substantially parallel and may also be referred to as a ground reference lines or ground reference plates. In one embodiment, the ground reference lines 103 are oriented in a co-planar manner (i.e., in the same physical layer) and substantially in line with the drive elements 101 (i.e., each ground reference line 103 is aligned with one associated drive element 101). The ground reference elements 103 are oriented such that each crosses the reference pickup element 106 to provide a ground and noise reference for the reference pickup element 106.

In various embodiments, a drive signal applied to the sensor structure 100 (described below) is coupled to the reference pickup element 106. For this purpose, the sensor structure 100 includes one or more reference pickup drive elements (or reference pickup drive lines) connected to a drive signal source (described below) and capacitively coupled to the reference pickup element 106. In one embodiment, the reference pickup drive element comprises a reference drive element 104. In an embodiment, the reference drive element 104 is not aligned with an associated drive element 101, such as the ground reference lines 103, and is located between the compensation drive line 105 and the end-most ground reference line 103.

The reference drive element 104 may be formed as an elongated, flat strip of conductive material (e.g., copper, aluminum, gold) and may also be referred to as an reference drive line or reference drive plate. The reference drive element 104 is oriented such that it crosses the reference pickup element 106 to thereby capacitively couple the reference drive element 104 with the reference pickup element 106 and thus couple a drive signal (described below) that is applied to the reference drive element 104 to the reference pickup element 106. In one embodiment, the reference drive line 104 is oriented in a co-planar manner (i.e. in the same physical layer) parallel with the plurality of ground reference elements 103. In yet another embodiment the reference drive element 104 is positioned in a different physical layer from one or more of the ground reference elements 103.

Each location where a drive element 101 and a pickup element 102 cross forms an impedance-sensitive electrode pair. When no object is in contact with or in close proximity to the impedance-sensitive electrode pair, the impedance-sensitive electrode pair has a first impedance determined by characteristics of the electrode pair, such as dimensions of the drive element 101 and dimensions of the pickup element 102 (which determine the area of overlap between the drive element 101 and the crossing pickup element 102 at each electrode pair) and the thickness and the dielectric properties of the insulating layer 107. The first impedance is equivalent to a parallel plate capacitor where the area of the plate capacitor is determined by the overlapping area of the drive element 101 and the pickup element 102. In one embodiment, the widths of the drive elements 101 and the pickup elements 102 are equal, and thus the area of overlap defined by the width of the drive line and the width of the pickup line has equal width and length. Other configurations are possible in which the width of the drive elements 101 and the pickup elements 102 are different. For example, in one embodiment, the width of each of the drive elements 101 is twice the width of each of the pickup elements 102, or vice versa.

Impedances between each crossing pickup element 102 and the compensation drive element 105, between each crossing ground reference element 103 and the reference pickup element 106, and between the compensation drive element 105 and the reference pickup element 106 are determined by characteristics of the respective elements, such as dimensions of the elements (which determine the area of overlap between the elements) and the thickness and the dielectric properties of the insulating layer 107. Such characteristics can be specified to achieve balanced impedances between the various elements for the purpose of noise cancellation.

In one embodiment, the drive elements 101, the pickup elements 102, the reference pickup element 106, the compensation drive element 105, and the reference drive element 104 have dimensions such that a second impedance between crossing pickup element 102 and the compensation drive element 105 when no object is present, a third impedance between crossing reference drive element 104 and the reference pickup element 106 when no object is present, and a fourth impedance between the compensation drive element 105 and the reference pickup element 106 when no object is present are substantially equal to the first impedance. In one embodiment, the widths of the drive elements 101, the pickup elements 102, the reference pickup element 106, the compensation drive element 105, and the ground reference elements 103 are equal. In other embodiments, the widths of the elements are different. In one other embodiment, the widths of the drive elements 101, the compensation drive element 105, and the ground reference elements 103 are the same and are twice the widths of the pickup elements 102 and the reference pickup element 106.

In one embodiment, the dimension of the ground reference elements 103 are such that a fifth impedance between each ground reference element 103 and the reference pickup element 106 is substantially equal to the first impedance. In one embodiment, the width of the drive element 104 is equal to the width of the ground reference elements 103.

Figure 2:
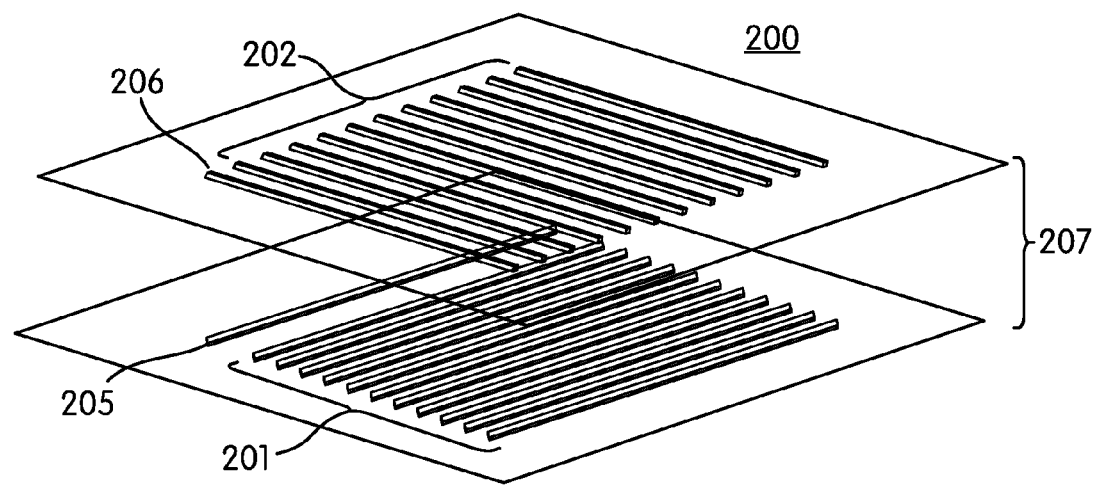
FIG. 2 illustrates a top perspective view of a fingerprint sensor according to an embodiment of the present invention.

FIG. 2 illustrates a portion of an exemplary fingerprint sensor structure 200 according to an alternate embodiment. The sensor 200 includes a plurality of drive elements 201 and a plurality of pickup elements 202. In one embodiment, the drive elements 201 may be formed as elongated, flat strips of conductive material (e.g., copper, aluminum, gold) that are substantially parallel to each other and which may also be referred to as drive lines or drive plates. The pickup elements 202 may be formed as elongated, flat strips of conductive material (e.g., copper, aluminum, gold) that are substantially parallel to each other and which may also be referred to as pickup lines or pickup plates. An insulating layer 207 made of a dielectric material separates the drive lines 201 and the pickup lines 202. The drive elements 201 and the pickup elements 202 are oriented transversely to each other and, in one embodiment, are substantially perpendicular to each other, thereby forming an area of overlap between the drive lines 201 and the crossing pickup lines 202.

The sensor structure 200 further comprises at least one reference pickup element 206. In one embodiment, the reference pickup element 206 may be formed as an elongated, flat strip of conductive material (e.g., copper, aluminum, gold) that is substantially parallel with the pickup elements 202 and which may also be referred to as a reference pickup line or pickup plate. In one embodiment, the reference pickup element 206 is positioned on one side of the plurality of pickup elements 202 as an end line. In another embodiment, a second reference pickup element may be positioned on an opposite side of the plurality of pickup elements 202. In a further alternate embodiment, a reference pickup element may be positioned between two adjacent pickup lines 202. In a still further alternate embodiment, the reference pickup line 206 is not a continuous strip, as shown in FIG. 2, but may comprise two or more segments arranged end-to-end (or overlapping) and parallel to the pickup lines 202, although the segments may not necessarily be collinear with each other.

The sensor further comprises a compensation drive element 205. In one embodiment, the compensation drive element 205 may be formed as an elongated, flat strip of conductive material (e.g., copper, aluminum, gold) that is substantially parallel with the drive elements 201 and may also be referred to as a compensation drive line or compensation drive plate. The compensation drive element 205 is oriented such that it crosses the pickup elements 202 and the reference pickup element 206 to thereby capacitively couple the compensation drive element 205 with the pickup elements 202 and the reference pickup element 206 and thus couple an inverted drive signal (described below) that is applied to the compensation drive element 205 to the pickup elements 202 and the reference pickup element 206. In one embodiment the compensation drive element 205 is located in the same physical layer as the drive elements 201. In yet another embodiment the compensation drive element 205 is positioned in a different physical layer from one or more of the drive elements 201.

In the embodiment of FIG. 2, the sensor structure 200 does not include a plurality of ground reference elements (such as ground reference elements 103 of sensor structure 100 as shown in FIG. 1) for reasons that will be explained below.

Furthermore, in an embodiment, the sensor structure 200 does not include a reference drive element (such as reference drive element 104 of sensor structure 100). Instead, the reference pickup element 206 of sensor structure 200 crosses over the drive lines 201 thereby capacitively coupling the drive lines 201 with the pickup sensor element 206. Thus, the drive lines 201 of sensor structure 200 function as the reference pickup drive elements that are connected to a drive signal source (described below) and which couple the drive signal to the reference pickup element 206. reference drive Each location where a drive element 201 and a pickup element 202 cross forms an impedance-sensitive electrode pair. When no object is in contact with or in close proximity to the impedance-sensitive electrode pair, the impedance-sensitive electrode pair has a first impedance determined by characteristics of the electrode pair, such as dimensions of the drive element 201 and dimensions of the pickup element 202 (which determine the area of overlap between the drive element and the crossing pickup element at each electrode pair) and the thickness and the dielectric properties of the insulating layer 207. The first impedance is equivalent to a plate capacitor where the area of the plate capacitor is determined by the overlapping area of the drive element 201 and the pickup element 202. In one embodiment, the widths of the drive elements 201 and the pickup elements 202 are equal, and thus the area of overlap defined by the width of the drive line and the width of the pickup line has equal width and length. Other configurations are possible in which the width of the drive elements 201 and the pickup elements 202 are different. For example, in one embodiment, the width of each of the drive elements 201 is twice the width of each of the pickup elements 202 or vice versa.

Impedances between each crossing pickup element 202 and the compensation drive element 205, between a crossing drive element 201 and the reference pickup element 206, and between the compensation drive element 205 and the reference pickup element 206 are determined by characteristics of the respective elements, such as dimensions of the elements (which determine the area of overlap between the elements) and the thickness and the dielectric properties of the insulating layer 207. Such characteristics can be specified to achieve balanced impedances between the various elements for the purpose of noise cancellation.

In one embodiment, the drive elements 201, the pickup elements 202, the reference pickup element 206, the compensation drive element 205 have dimensions such that a second impedance between a crossing pickup element 202 and the compensation drive element 205 when no object is present, a third impedance between a crossing drive element 201 and the reference pickup element 206 when no object is present, and a fourth impedance between the compensation drive element 205 and the reference pickup element 206 are substantially equal to the first impedance when no object is present. In one embodiment, the widths of the drive elements 201, the pickup elements 202, the reference pickup element 206, and the compensation drive element 205 are equal. In other embodiments, the widths of the elements are different. For example, in one embodiment, the widths of the drive elements 201 and the compensation drive element 205 are the same and are twice the widths of the pickup elements 202 and the reference pickup element 206.

FIG. 3a illustrates a portion of an exemplary fingerprint sensor system 300. The fingerprint sensor system 300 includes a fingerprint sensor structure 100 as described above with reference to FIG. 1, a signal source 301, and a differential amplifier 302. The signal source 301 is adapted to provide a first signal to a drive element 101 and the reference drive element 104 and a second signal to the compensation drive element 105. In various embodiments, the second signal is a fixed reference amplitude phase inverted relative to the first signal. In one embodiment, the first signal is an alternating RF signal having a predetermined frequency, and the second signal could be provided by inserting an inverter 304 between the output of the signal source 301 and the compensation drive element 105. Thus, in various embodiments, the second signal is equal to the magnitude but not necessarily the phase of the first signal. The reference pickup element 106 crosses the compensation drive element 105 and the reference drive element 104 and is thereby coupled to the first signal, via reference drive element 104, and to the second signal, via the compensation drive element 105. But the coupling between the reference pickup element 106 and the compensation drive element 105 is not impedance sensitive to an object in contact or proximity to the reference pickup element 106.

The ground reference elements 103 are connected to local substrate ground thereby providing a ground reference for the reference pickup element 106 crossing the ground reference elements 103. In the fingerprint sensor system 300, the reference pickup element 106 is located within a finger contact area 303. Thus, the ground reference elements 103 provide a balanced ground coupling for the reference pickup element 106, which is subject to contact by a finger.

The differential amplifier 302 has a first input, a second input, and an output. The first input (e.g., the positive (+) input) of differential amplifier 302 is connected to a pickup element 102, which is coupled to the drive signal via each crossing drive element 101 and is coupled to the inverted drive signal via the compensation drive element 105. The second input (e.g., the negative (−) input) is connected to the reference pickup element 106, which is independent of the pickup elements 102 and is coupled to the drive signal via the reference drive element 104 and is coupled to the inverted signal via the compensation drive element 105. The output of the differential amplifier is a signal indicative of the presence of ridge and valley features of a finger above a finger contact area 303. For simplicity of illustration, one pickup element from the array 102 and one drive element from the array 101 is connected to the differential amplifier 302 and signal source 301, however each drive element 101 and pickup element 102 may be selectively and individually connected to the differential amplifier 302 by suitable switches and/or multiplexers (not shown) by methods and circuitry well known to the skilled person.

No signal is applied to the ground reference elements 103, and thus, the reference pickup element 106 is a passive reference as no change in signal is produced at the negative (−) input of the differential amplifier 302. That is, the signal at the negative (−) input is not sensitive to a change in impedance due to the finger or other object contacting, or proximate to, the reference pickup element 106. Thus, the reference pickup element 106 is not configured to be impedance sensitive with respect to the finger or other object contacting, or proximate to, the reference pickup element 106. The signal is, however, applied to the drive elements 101, and thus, the pickup elements 102 are active, and the signal coupled to the positive (+) input of the differential amplifier 302 does change due to the finger or other object contacting, or adjacent to, the pickup elements 102 because the signal at each electrode pair 101/102 is sensitive to a change in impedance due to the presence of the finger or other object.

FIG. 3b illustrates an equivalent circuit for the measurement of an impedance-sensitive electrode pair according to an embodiment of the present invention. The compensation drive element 105 and the reference drive element 104 are positioned outside the finger contact area 303, and the ground reference elements 103 are connected to ground to provide a ground reference for the reference pickup element 106 which is at least partially located within the fingerprint sensing area 303. A variable impedance Z1 is the impedance of a crossing drive element 101 and pickup element 102 and will vary due to the presence of a finger or other object and depending the surface features of the finger or object contacting or adjacent to the impedance-sensitive electrode pair 101/102. An impedance Z2 is the impedance between the pickup element 102 and the compensation drive element 105. An impedance Z3 is the impedance between the reference drive element 104 and the reference pickup element 106. An impedance Z4 is the impedance between the compensation drive element 105 and the reference pickup element 106. As Z1=Z2=Z3=Z4, this configuration constitutes a Wheatstone Balanced Bridge with the result that common mode noise coupled into any of these impedances appears equally at both the first and second input of the differential amplifier 302 to thereby cancel the noise, but only changes in impedance Z1 produce any net differential signal, hence effectively cancelling common mode noise. Accordingly, electronic noise (e.g., human body noise) that affects all the impedances Z1, Z2, Z3, and Z4 is cancelled out, but changes in impedance Z1 at the impedance-sensitive electrode pairs formed at the crossings of drive elements 101 and pickup elements 102 due to an object in close proximity or contacting the contact area 303 (e.g., ridges and valleys of a fingerprint) produce an output at the differential amplifier 302 that is substantially free of such noise.

Figure 4B:
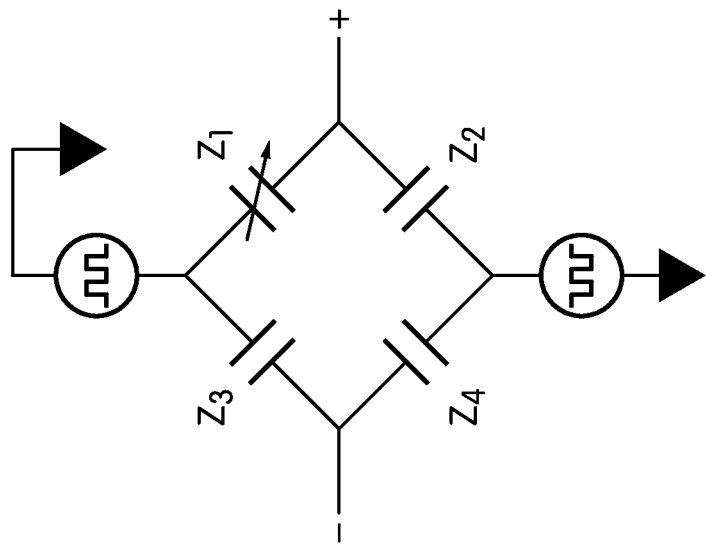
FIG. 4b illustrates an electronic circuit for the measurement of an impedance-sensitive electrode pair according to an embodiment of the present invention.
Figure 4A:
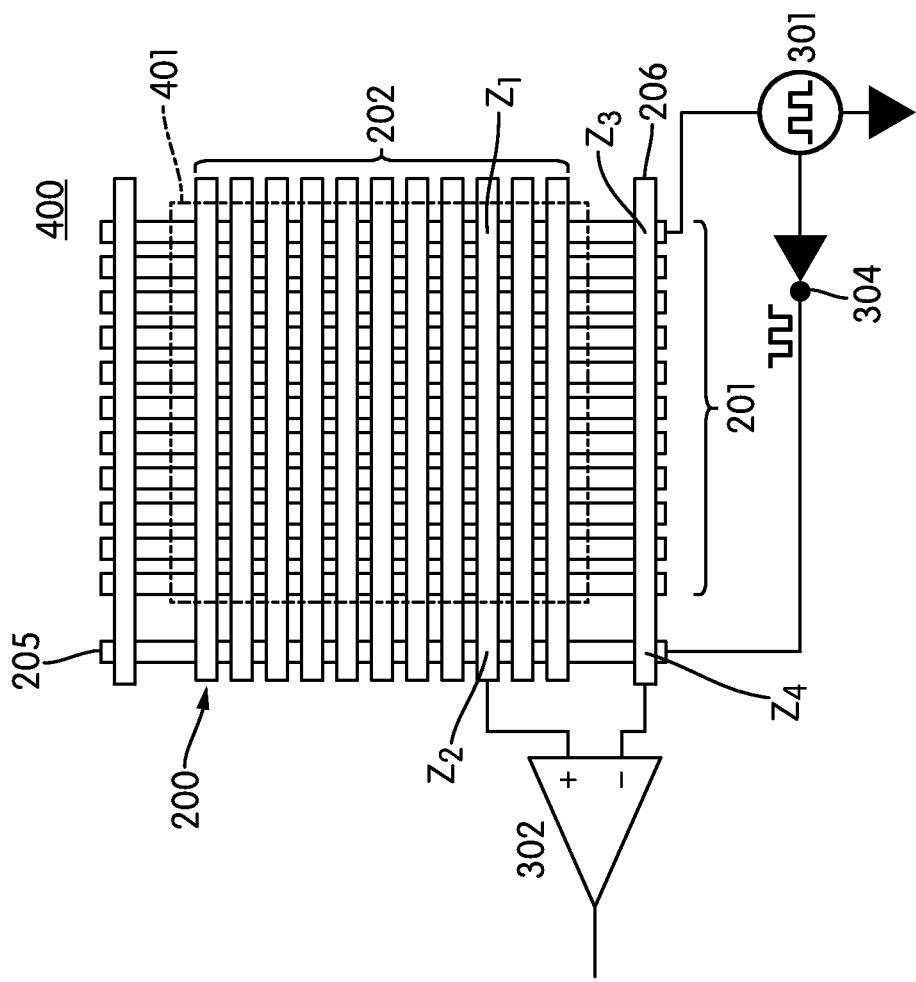
FIG. 4a illustrates an embodiment of a fingerprint sensor system according to an embodiment of the present invention.

FIG. 4a illustrates portion of an exemplary fingerprint sensor system 400. The fingerprint sensor system 400 includes a fingerprint sensor structure 200 as described above with reference to FIG. 2, a signal source 301, and a differential amplifier 302. The signal source 302 is adapted to provide a first signal to a drive element 201 and a second signal to the compensation drive element 205. The second signal is the inverse of the first signal. In one embodiment, the first signal is an alternating RF signal having a predetermined frequency. In one embodiment, the second signal could be provided by inserting an inverter 304 between the output of the first signal and the compensation drive element 205. The differential amplifier 302 has a first input, a second input, and an output. The first input (e.g., the positive (+) input) is connected to a pickup element 202, which is coupled to the drive signal via each crossing drive element 201 and is coupled to the inverted drive signal via the compensation drive element 205. The second input (e.g., the negative (−) input) is connected to the reference pickup element 206, which is coupled to the drive signal via the drive elements 201 and is coupled to the inverted signal via the compensation drive element 205. The output of the differential amplifier 302 is a signal indicative of the presence of ridge and valley features of a finger above a finger contact area 401. For simplicity of illustration, one pickup element 202 and one drive element 201 is connected to the differential amplifier 302 and signal source 301, however each drive element 201 and pickup element 202 may be selectively and individually connected to the differential amplifier 302 by suitable switches and/or multiplexers (not shown) by methods and circuitry well known to the skilled person.

The reference pickup element 206 is located just outside the direct finger contact area 401 but close enough so that human body noise is coupled into element 206 for the purpose of noise cancelation using differential amplifier 302. In addition local ground sensor noise is picked up through drive lines 201 into reference pickup 206 to be subtracted out by differential amplifier 302.

FIG. 4b illustrates an equivalent circuit for the measurement of an impedance-sensitive electrode pair according to an embodiment of the present invention. The compensation drive element 205 and reference pickup element 206 are positioned outside the finger contact area 401. A variable impedance Z1 is the impedance of a crossing drive element 201 and pickup element 202 and will vary due to the presence of a finger or other object and depending the surface features of the finger or object contacting or adjacent to the impedance-sensitive electrode pair 201/202. An impedance Z2 is the impedance between the pickup element 202 and the compensation drive element 205. An impedance Z3 is the impedance between drive element 201 and the reference pickup element 206. An impedance Z4 is the impedance between the compensation drive element 205 and the reference pickup element 206. As Z1=Z2=Z3=Z4, this configuration constitutes a Wheatstone Balanced Bridge with the result that common mode noise coupled into any of these impedances appears equally at both the first and second input of the differential amplifier to thereby cancel the noise, but only changes in impedance of Z1 produce any net differential signal, hence effectively cancelling common mode noise.

The different embodiments of the present invention may be manufactured by commercially available semiconductor processes as a single ASIC, may be split onto several ASICs, or may be formed as a combination of a sensor substrate and one or more ASICs.

Figure 5:
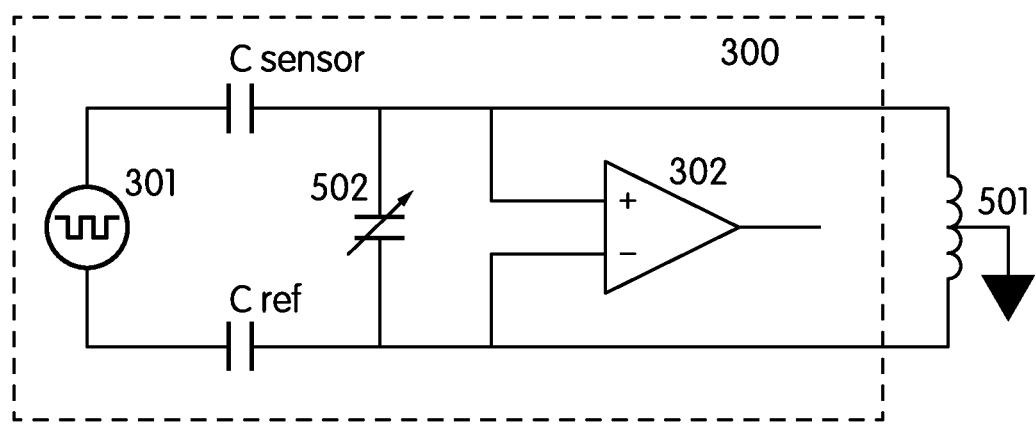
FIG. 5 illustrates an electronic circuit of fingerprint sensor system.

FIG. 5 illustrates a noise canceling filter structure that may be used in conjunction with the structures in FIGS. 3 and 4 or independently according to an embodiment of the present invention. Common mode noise current may be large enough to integrate over time into $C_{sensor}$ and $C_{ref}$, which constitute the input capacitive sensing and a reference plate, respectively, and may saturate the input circuitry of the differential amplifier 302 and cause it to no longer respond to input signals in a linear fashion producing voided areas in the image that have no fingerprint information. To remedy this behavior, the circuit of the fingerprint sensor system 300 further comprises a split inductor 501 and an adjustable capacitor 502 connected in parallel between the first and second input of the differential amplifier 302 to provide a common mode shunting tunable resonating bandpass filter. In one embodiment, the tunable bandpass filter has a center frequency tuned to the predetermined frequency of the first signal from signal generator 301. Common mode current having frequencies outside the range of the bandpass filter are shunted to ground and are thus efficiently attenuated before the inputs of the differential amplifier 302. This filter arrangement is capable of rejecting the large current spikes typically produced by poorly isolated low cost chargers used for consumer devices like cell phones.

In one embodiment, the inductor 501 comprises a center-tapped inductor comprised of two substantially identical discrete inductors. The substantially identical inductors may have a high inductance L and the adjustable capacitor a low capacitance C to provide a bandpass filter with a high Q factor.

Figure 6:
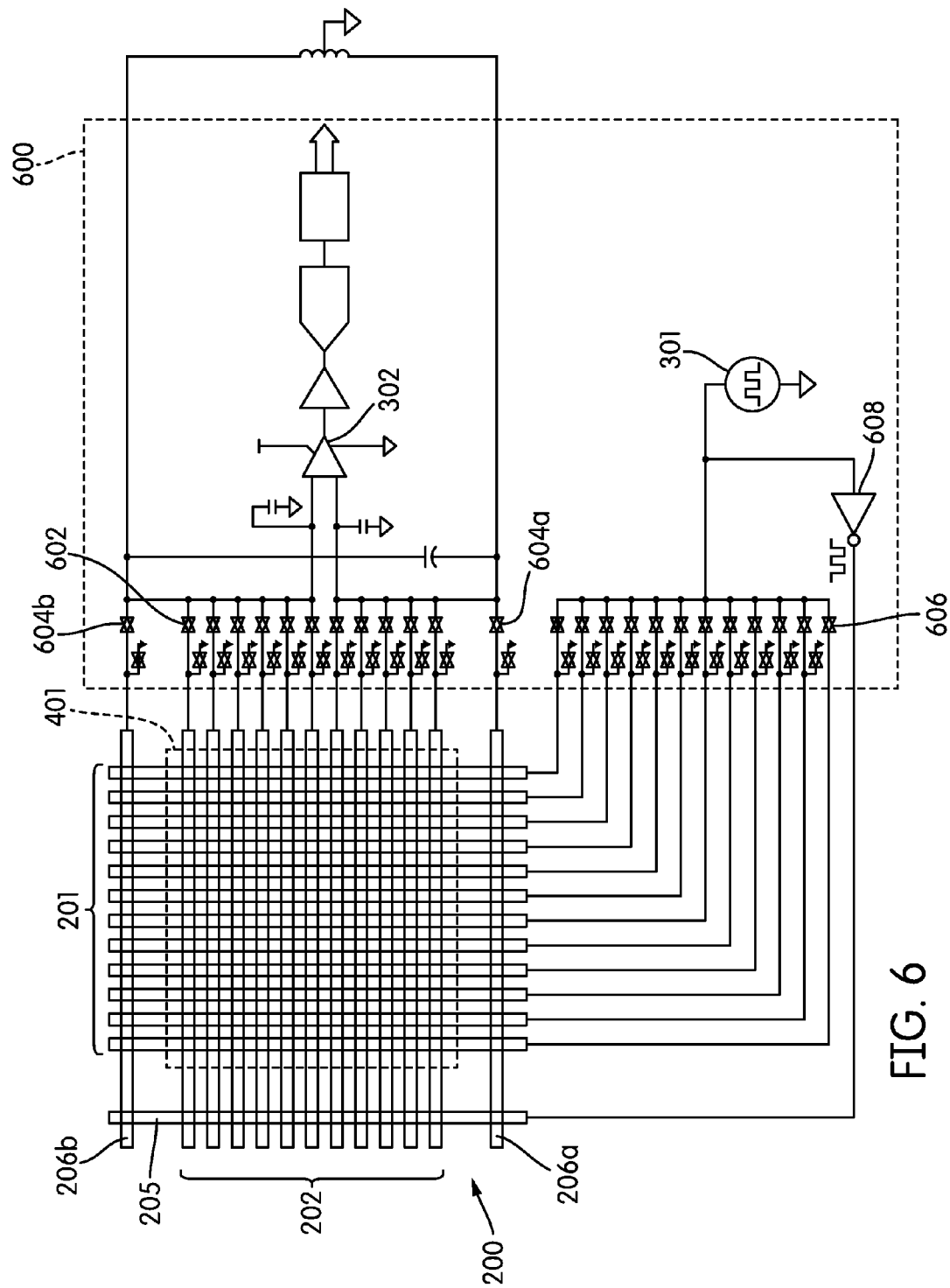
FIG. 6 schematically illustrates a fingerprint sensor system comprising a sensor portion and an electronics portion embodied as an ASIC.

FIG. 6 schematically illustrates a finger print sensor system comprising a sensor 200 and an ASIC 600. Sensor 200 is comparable to the sensor 200 shown in FIG. 2. Alternatively, the fingerprint sensor system as illustrated in FIG. 6 could encompass a sensor 100 as shown in FIG. 1. Sensor 200 includes drive elements 201 arranged, for example, in a parallel, co-planar configuration, and a compensation drive element 205 arranged, for example, parallel to and spaced apart from the drive elements 201. Sensor 200 includes pickup elements 202 arranged, for example, in a parallel, co-planar configuration, and reference pickup elements 206a, 206b arranged, for example, parallel to and spaced apart from the pickup elements 202.

The pickup elements 202 and the drive elements 201 are arranged transversely to each other and the area where pickup elements 202 cross drive elements 201 defines the contact area 401.

The pickup elements 202 and/or the drive elements 201 may be encompassed within layers comprising one or more flexible substrates or one or more rigid substrates or some combination of rigid and flexible substrates, for example, as described in U.S. Pat. No. 8,421,890 and U.S. Patent Application Publication No. 2013-0279769, the disclosures of which are hereby incorporated by reference.

The ASIC 600 includes the signal source 301 connected to the drive elements 201 or connectable, e.g., selectively by driver switches 606, to the drive elements 201. In one embodiment, the compensation drive element 205 is connected to the drive oscillator 301 via an inverter 608. ASIC 600 further includes the differential amplifier 302 connected to the pickup elements 202 or connectable, e.g., selectively by pickup switches 602, to the pickup elements 202. In one embodiment, the reference pickup elements 206a, 206b are connected to the differential amplifier 302 by reference pickup switches 604a, 604b, respectively. The reference pickup element 206a is typically selected when pickup elements 202 of the lower half of the contact area 401 is selected to provide the most relevant reference signal, i.e., the reference pickup element 206a is closer to the selected pickup element 202 than the other reference pickup element 206b. Likewise, the other reference pickup element 206b is selected when a pickup element 202 of the upper half of the contact area 401 is selected.

Figure 7:
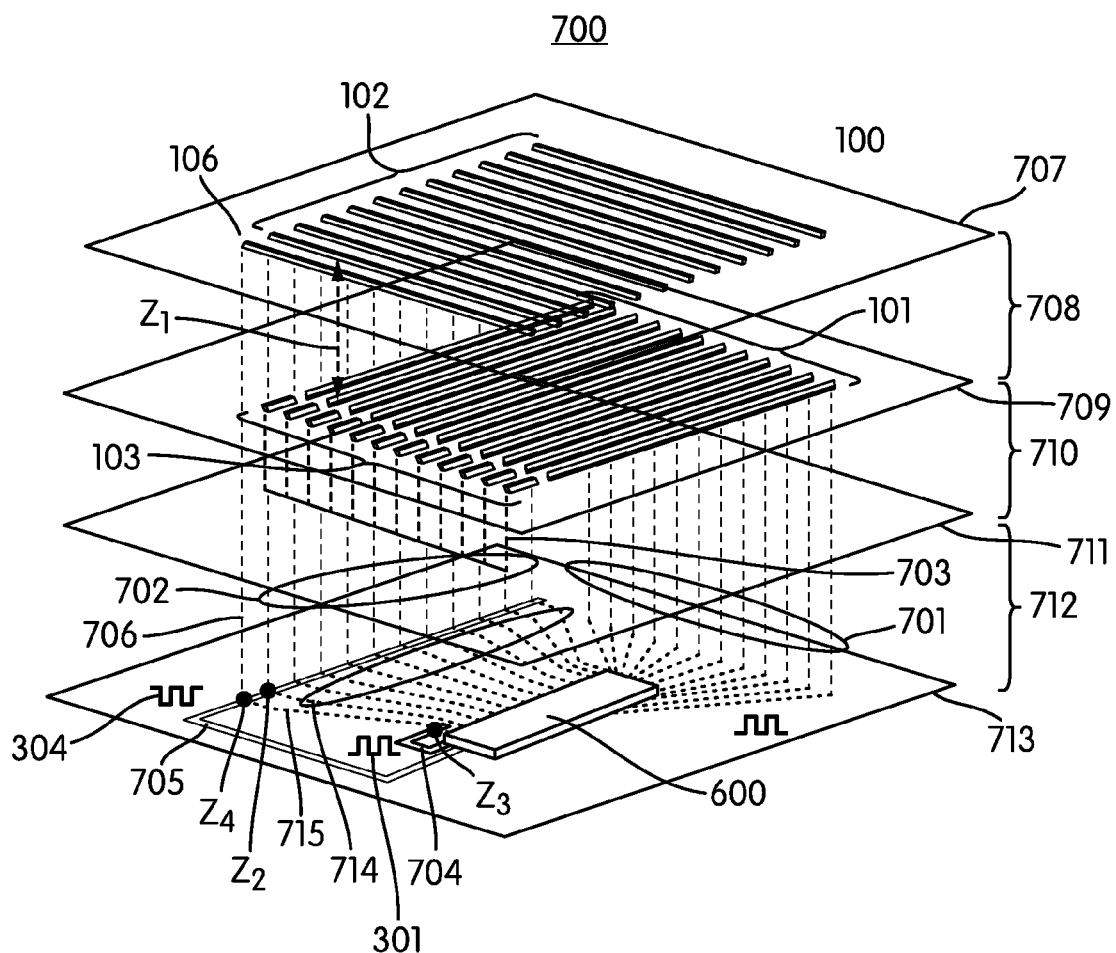
FIG. 7 illustrates an embodiment of a fingerprint sensor system according to an embodiment of the present invention.

FIG. 7 illustrates a portion of an exemplary fingerprint system 700. The fingerprint sensor system 700 includes a fingerprint sensor structure 100 as described above with reference to FIG. 1 and FIG. 3a. The fingerprint system 700 comprises a plurality of pickup elements 102 and a reference pickup element 106 formed in a first layer, or pickup layer, 707 of conductive material (e.g. copper, aluminum, gold), and a plurality of drive lines 101 and a plurality of ground reference elements 103 formed in a second layer, or drive layer, 709 of conductive material (e.g. copper, aluminum, gold). The fingerprint system 700 further comprises a third layer 711 and a fourth layer 713 of conductive material (e.g. copper, aluminum, gold). The first 707 and second 709 conductive layers, the second 709 and third 711 conductive layers, and the third 711 and fourth 713 conductive layers are separated by first, second, and third insulating layers 708, 710, 712, respectively, made of a dielectric material. An ASIC 600 is connected to the fourth conductive layer, or interconnect layer, 713. The third conductive layer, or ground layer, 711 is connected to ground through the ASIC 600 or other possible connections to ground.

The ground reference elements 103 are connected to the ground layer 711 by vias 703 extending through the second insulating layer 710. The drive elements 101 are connected to the signal source 301 in the ASIC 600 (see FIG. 6) by vias 701 extending through the second 710 and third 712 insulating layers. The pickup elements 102 are connected to the first input of the amplifier 302 in the ASIC 600 by vias 702 extending through the first 708, second 710 and third 712 insulating layers and a plurality of pickup interconnect elements 714 on the interconnect layer 713. The reference pickup element 106 is connected to the second input of the amplifier 302 in the ASIC 600 (see FIG. 6) through via 706 in the first 708, second 710 and third 712 insulating layers and a reference pickup interconnect element 715 on the interconnect layer 713.

Figure 8:
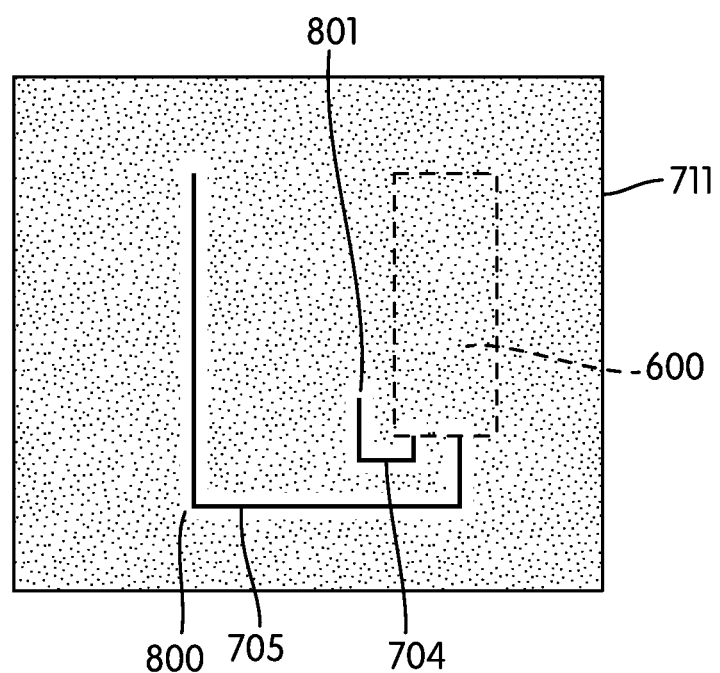
FIG. 8 illustrates a conductive ground layer of the fingerprint sensor system.

A reference drive element 704 is connected to the signal source 301 in the ASIC 600 and a compensation drive element 705 is connected to the inverter 304 of the ASIC 600 through vias (not shown) in the third insulating layer 712. For ease of illustration of the current embodiment, the compensation drive element 705 and the reference drive element 704 are shown as part of the interconnect layer 713, however, the compensation drive element 705 and the reference drive element 704 are located in the ground layer 711 above the interconnect layer 713. FIG. 8 illustrates the compensation drive element 705 and the reference drive element 704 located within cutouts 800 and 801, respectively, in the conductive ground layer 711.

Returning to FIG. 7, the pickup interconnect elements 714 pass under the compensation drive element 705. The reference pickup interconnect element 715 passes under the compensation drive element 705 and the reference drive element 704. The impedances between each crossing pickup interconnect element 714 and the compensation drive element 705, between the reference pickup interconnect element 715 and the compensation drive element 705, and between the reference pickup interconnect element 715 and the reference drive element 704 are determined by the characteristics of the respective elements, such as dimensions of the elements (which determine the area of overlap between the elements) and the thickness and the dielectric properties of the third insulating layer 712. Such characteristics can be specified to achieve desired, e.g., balanced, impedances between the various elements.

In one embodiment, the pickup elements 102 and drive elements 101 determine a first impedance across the insulating layer 708, as described above with reference to FIG. 1 and FIG. 3a. Further, the reference pickup 106, the pickup interconnect elements 714, the reference pickup interconnect element 715, the compensation drive element 705, and the reference drive element 704 have dimensions such that a second impedance between crossing pickup interconnect element 714 and the compensation drive element 705 when no object is present, a third impedance between the crossing reference drive element 704 and the reference pickup interconnect element 715 when no object is present, and a fourth impedance between the compensation drive element 705 and the reference pickup interconnect element 715 when no object is present are substantially equal to the first impedance.

Now also referring to FIG. 7, the variable impedance Z1 of the current embodiment is the impedance of a crossing drive element 101 and a pickup element 102. The second impedance Z2 is the impedance between a pickup interconnect element 714 and the compensation drive element 705. The third impedance Z3 is the impedance between the reference drive element 704 and the reference pickup interconnect element 715. The fourth impedance Z4 is the impedance between the compensation drive element 705 and the reference pickup interconnect element 715. As Z1=Z2=Z3=Z4, this configuration constitutes a Wheatstone Balanced Bridge with the result that common mode noise coupled into any of these impedances appears equally at both the first and second input of the differential amplifier but only changes in impedance of Z1 produce any net differential signal, hence effectively cancelling common mode noise.

Figure 9A:
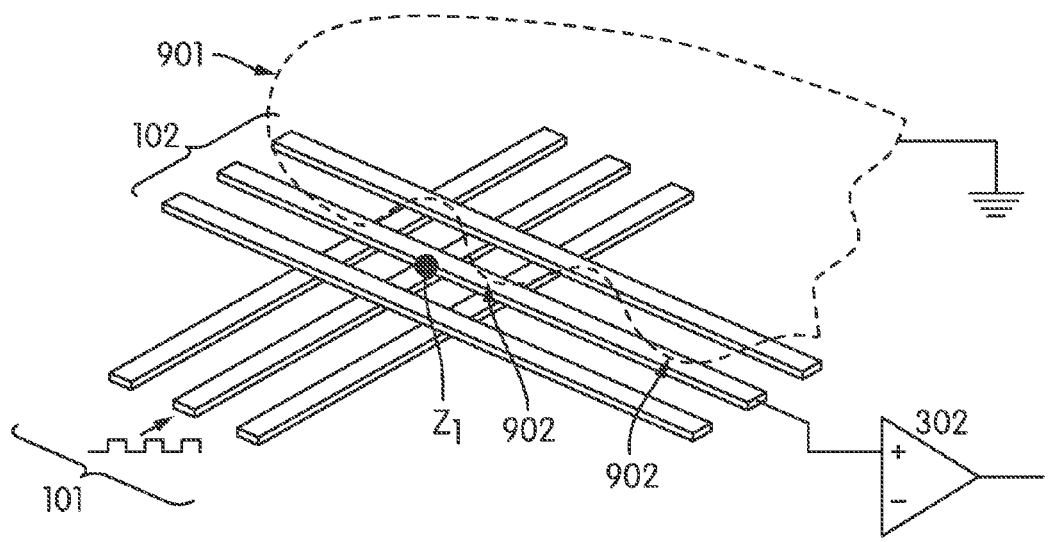
FIGS. 9a and 9b are partial views of a fingerprint pattern in proximity to a portion of a fingerprint sensor and illustrating a parasitic load capacitance introduced by the fingerprint pattern proximate to an active pickup line of the sensor.
Figure 9B:
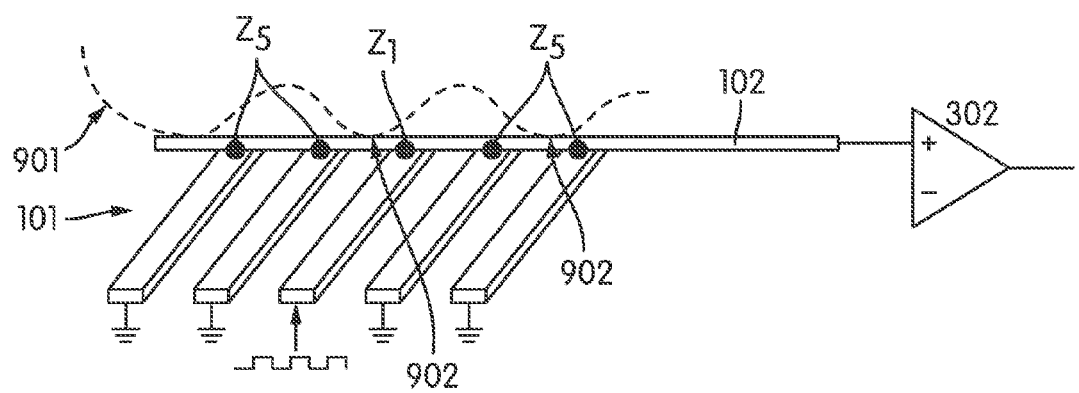

FIGS. 9a and 9b illustrate the parasitic load capacitance introduced by a fingerprint pattern on a finger 901 proximate to an active pickup element 102 (i.e., the pickup element 102, which, at that instance, is connected to the differential amplifier 302). As shown in FIGS. 3, 4, and 7, the crossing between an active pickup element 102 and an active drive element 101 (i.e., the drive element 101, which, at that instance, is connected to the signal source 301) forms an impedance sensitive node, or pixel, Z1 that couples into the positive (+) input of the amplifier 302. Pickup elements 102 have an additional parasitic capacitance Z5 to ground where the active pickup element 102 crosses over inactive drive elements 101 (i.e., the drive elements 101 which, at that instance, are not connected to a signal source signal source 301), which are held at substantially ground potential. Each of the ridge features 902 of the finger 901 surface affects the parallel path impedance of Z5 to ground as the body of the person touching the sensor provides another path to ground. This additional impedance path Z5 to ground will affect the magnitude of the signal presented to amplifier 302.

Similarly, the impedance to ground of reference pickup plate 106 is formed by a combination of ground reference elements 103 crossing 106 (Z6), and the impedance of finger 901 in close proximity (see FIG. 3a), and remains constant for the capture of an entire fingerprint image for which each pickup element of the array of pickup elements 102 is multiplexed into and subtracted by amplifier 302 from reference plate 106.

Figure 9C:
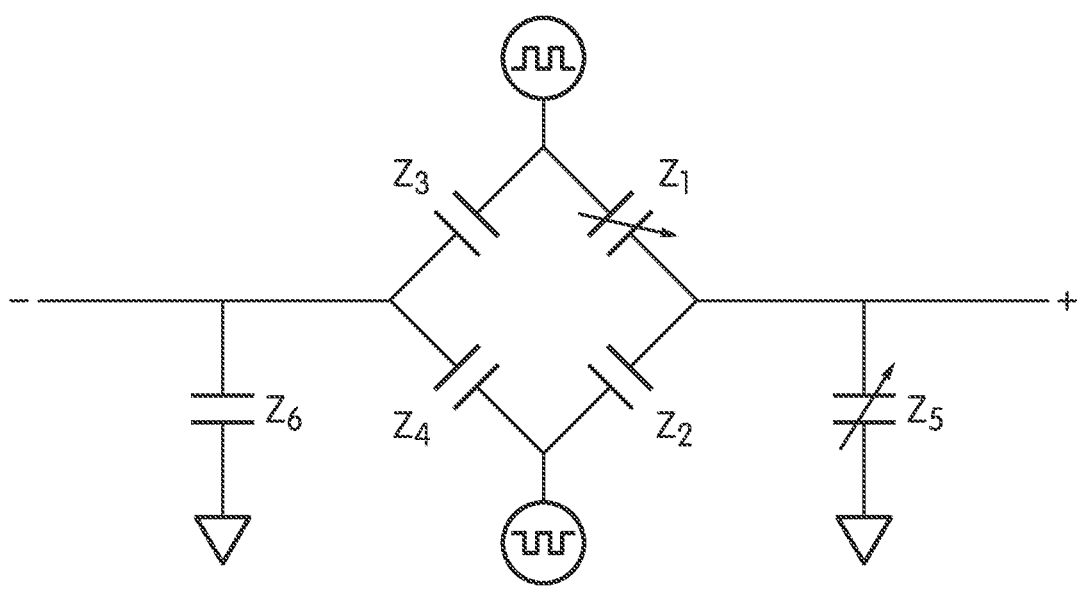
FIG. 9c shows a lumped element schematic of the circuit including the parasitic impedances.

FIG. 9c shows a lumped element schematic of the circuit including the parasitic impedances Z5 and Z6. The amount of surface finger contact is determined by the number, size, and spacing of fingerprint patterns, resulting in parasitic impedance Z5 having a pattern-dependent impedance on pickup elements 102. For a given active pickup element 102, the parasitic impedance to ground Z5 will be substantially equal for all the inactive electrode pairs (i.e., each intersection between the active pickup element 102 and each inactive drive line 101) formed on that line. Each individual pickup line within the pickup element array 102 will have a different parasitic impedance Z5 to ground due to local fingerprint pattern variations as well as production variations in the widths, spacing, and thickness of the array 102 formed.

Compensation for signal variations caused by parasitic loads Z5 and Z6 may be achieved by taking advantage of the fact that parasitic impedance Z5 will be substantially constant along a given active pickup element 102 and parasitic impedance Z6 will be constant along a given reference pickup element 106. The finger contact variations in Z5 and Z6 will result in gain variations which are proportional to the ratio Z1/Z5. While impedance Z1 varies due to fingerprint pattern variations at each intersection along pickup element 102 those affects are typically very small (<10%) relative to the nominal impedance of Z1, which is typically on the order of 1 ff for elements configured to produce a 500 dpi sensor. Therefore, the gain error may be approximated as a fixed offset specific to each pickup element in array 102. Thus, the gain error due to finger loading may be corrected by computing the average of all of the signal levels measured at the output of amplifier 302 with a given pickup element 102 and subtracting that average from the individual pixel values (i.e., the signal at the electrode pair comprising the active pickup element 102 and the active drive element 101) along the active pickup element 102.

A simple algorithm that measures, stores and subtracts these effects can be applied in either software or hardware.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the inventions requires features or combinations of features other than those expressly recited in the claims. Accordingly, the present invention is deemed to include all modifications and variations encompassed within the spirit and scope of the following appended claims.

The invention claimed is:

1. A fingerprint sensor system, comprising:
   a plurality of substantially parallel drive lines;
   a plurality of substantially parallel pickup lines oriented transversely to the plurality of drive lines;
   an insulating layer separating the plurality of pickup lines from the plurality of drive lines;
   a plurality of electrode pairs, each electrode pair being defined at a location where a pickup line crosses a drive line, wherein each electrode pair has an impedance that is sensitive to an object contacting or in close proximity to the electrode pair;
   one or more reference pickup line(s) oriented substantially parallel with the plurality of pickup lines;
   one or more compensation drive line(s) oriented substantially parallel with the drive lines and crossing the pickup lines and the reference pickup line(s) to capacitively couple the compensation drive line(s) into the pickup lines and the reference pickup line(s);
   a reference pickup drive line crossing the reference pickup line to capacitively couple the reference pickup line and the reference pickup drive line;
   wherein each electrode pair has a first impedance when no object is contacting or in close proximity to the electrode pair and wherein the drive lines, the pickup lines, the reference pickup line, the compensation drive line, and the reference pickup drive line are configured such that a second impedance between the compensation drive line and a crossing pickup line, a third impedance between the reference pickup line and a crossing reference pickup drive line, and a fourth impedance between the compensation drive line and the reference pickup line are equal to the first impedance;
   a signal source configured to provide a first signal to one of the drive lines and the reference pickup drive line and to provide a second signal to the compensation drive line, where the second signal is a fixed reference amplitude phase inverted relative to the first signal; and
   a differential amplifier having a first input, a second input, and an output, wherein the first input is connected to a pickup line, the second input is connected to one or more of the reference pickup line(s), and the output of the differential amplifier is indicative of the presence of ridge and valley features of a finger contacting or in close proximity to one or more of the electrode pairs.

2. The fingerprint sensor system of claim 1, wherein each of the drive lines, the compensation drive line, and the reference pickup drive line have a first width and the pickup lines and the reference pickup line have a second width, wherein the second width is different from the first width.

3. The fingerprint sensor system of claim 2, wherein the first width is twice the second width.

4. The fingerprint sensor system of claim 1, wherein the compensation drive line is located in a physical layer different from the drive lines.

5. The fingerprint sensor system of claim 4, wherein the compensation drive line is located within a conductive ground layer.

6. The fingerprint sensor system of claim 5, wherein the compensation drive line is located in a cutout in the conductive ground layer.

7. The fingerprint sensor system of claim 1, wherein the reference pickup drive line comprises a reference drive line that is physically separated from and parallel to the drive lines.

8. The finger print sensor system of claim 7, wherein the reference drive line is located in a physical layer different from the drive lines.

9. The fingerprint sensor system of claim 8, wherein the reference drive line is located in a conductive ground layer.

10. The fingerprint sensor system of claim 9, wherein the reference drive line is located within a cutout in the conductive ground layer.

11. The fingerprint sensor system of claim 1, wherein each reference pickup drive line comprises a portion of a drive line.

12. The fingerprint sensor system of claim 1, comprising two reference pickup lines.

13. The fingerprint sensor system of claim 1, wherein each reference pickup line comprises a single strip of conductive material.

14. The fingerprint sensor system of claim 1, further comprising a plurality of substantially parallel ground reference lines oriented substantially in-line with the plurality of drive lines and connected to ground, wherein each ground reference line crosses the reference pickup line.

15. The fingerprint sensor system of claim 14, wherein the ground reference lines are connected to ground by vias to a ground layer.

16. The fingerprint sensor system of claim 1, wherein the plurality of drive lines are oriented substantially perpendicular to the plurality of pickup lines.

17. The fingerprint sensor system of claim 1, wherein the compensation drive line is located outside a finger contact area defined by crossing drive lines and pickup lines.

18. The fingerprint sensor system of claim 1, wherein the reference pickup line is located outside the finger contact area.

19. The fingerprint sensor system of claim 1, wherein the system further comprises:
a ground layer having at a first and a second cutout, wherein the compensation drive line is located within the first cutout and the reference pickup drive line is located within the second cutout;
a second insulating layer separating the ground layer from the plurality of drive lines;
an interconnect layer;
a third insulating layer separating the interconnect layer from the ground layer;
a plurality of pickup interconnect elements located in the interconnect layer and crossing the compensation drive line, and the pickup interconnect elements are connected to the plurality of pickup element by vias, wherein the crossing of the pickup interconnect elements and the compensation drive line provides the capacitive coupling of the pickup lines with the compensation drive line;
a reference pickup interconnect element located in the interconnect layer and crossing the compensation drive line and the reference pickup drive line, and the reference pickup interconnect element is connected to the reference pickup line by a via, wherein the crossing of the reference pickup interconnect element and the compensation drive line provides the capacitive coupling of the reference pickup line with the compensation drive line, and the crossing of the reference pickup interconnect element and the reference pickup drive line provides the capacitive coupling of the reference pickup line with the reference pickup drive line.

20. The fingerprint sensor system of claim 1, wherein the first signal is an alternating RF signal having a predetermined frequency.

21. The fingerprint sensor system of claim 20, wherein the system further comprises:
an inductor connected between the first and second input of the differential amplifier; and
an adjustable capacitor connected between the first and second input of the differential amplifier to provide a tunable bandpass filter having a center frequency tuned to the predetermined frequency of the first signal.

22. The fingerprint sensor system of claim 21, wherein the inductor is a center-tapped inductor.

23. The fingerprint sensor system of claim 22, wherein the center-tapped inductor comprises two substantially identical discrete inductors.

24. The fingerprint sensor system of claim 23, wherein the two substantially identical discrete inductors have a high inductance L and the adjustable capacitor has a low capacitance C to provide a bandpass filter with a high Q factor.

25. The fingerprint sensor system of claim 1, wherein the plurality of drive lines are disposed in a drive layer, and the one or more compensation drive lines are located in the drive layer or are located in a layer different from the drive layer.

26. A fingerprint sensor system, comprising:
a plurality of substantially parallel drive lines;
a plurality of substantially parallel pickup lines oriented transversely to the plurality of drive lines to capacitively couple each pickup line to a drive line at each location where a pickup line crosses a drive line;
an insulating layer separating the plurality of pickup lines from the plurality of drive lines;
a reference pickup line oriented substantially parallel with the pickup lines;
a compensation drive line oriented substantially parallel with the drive lines and crossing the pickup lines and the reference pickup line to capacitively couple the compensation drive line with the pickup lines and the reference pickup line;
a reference pickup drive line crossing the reference pickup line to capacitively couple the reference pickup line and the reference pickup drive line;
a signal source configured to provide a first signal to one of the drive lines and the reference pickup drive line and to provide a second signal to the compensation drive line, where the second signal is the inverse of the first signal; and a differential amplifier having a first input, a second input, and an output, wherein the first input is connected to a pickup line, thereby coupling (a) the first signal to the first input via the pickup line and a capacitively-coupled drive line and (b) the second signal to the first input via the pickup line and the capacitively-coupled compensation drive line, and wherein the second input is connected to the reference pickup line, thereby coupling (a) the first signal to the second input via reference pickup line and the capacitively-coupled reference pickup drive line and (b) the second signal to the second input via the reference pickup line and the capacitively-coupled compensation drive line, and the output of the differential amplifier is substantially free of common mode noise.

27. The fingerprint sensor system of claim 26, wherein
each location where a pickup line crosses a drive line defines an electrode pair,
each electrode pair has an impedance that is sensitive to an object contacting or in close proximity to the electrode pair;
  each electrode pair has a first impedance when no object is contacting or in close proximity to the electrode pair, and
  wherein the drive lines, the pickup lines, the reference pickup line, the compensation drive line, and the reference pickup drive line are configured such that a second impedance between the compensation drive line and a crossing pickup line, a third impedance between the reference pickup line and a crossing reference pickup drive line, and a fourth impedance between the compensation drive line and the reference pickup line are equal to the first impedance.

28. The fingerprint sensor system of claim 26, wherein each of the drive lines, each of pickup lines, the reference pickup line, the compensation drive line, and the reference pickup drive line have a first width.

29. The fingerprint sensor system of claim 26, wherein each of the drive lines, the compensation drive line, and the reference pickup drive line have a first width and each of the pickup lines and the reference pickup line have a second width, wherein the second width is different from the first width.

30. The fingerprint sensor system of claim 29, wherein the second width is twice the first width.

31. The fingerprint sensor system of claim 26, wherein the compensation drive line is located in a physical layer different from the drive lines.

32. The fingerprint sensor system of claim 31, wherein the compensation drive line is located within a conductive ground layer.

33. The fingerprint sensor system of claim 32, wherein the compensation drive line is located in a cutout in the conductive ground layer.

34. The fingerprint sensor system of claim 26, wherein the reference pickup drive line comprises a reference drive line that is physically separated from and parallel to the drive lines.

35. The finger print sensor system of claim 34, wherein the reference drive line is located in a physical layer different from the drive lines.

36. The fingerprint sensor system of claim 34, wherein the reference drive line is located in a conductive ground layer.

37. The fingerprint sensor system of claim 36, wherein the reference drive line is located within a cutout in the conductive ground layer.

38. The fingerprint sensor system of claim 26, wherein each reference pickup drive line comprises a portion of a drive line.

39. The fingerprint sensor system of claim 26, comprising two reference pickup lines.

40. The fingerprint sensor system of claim 26, wherein each reference pickup line comprises a single strip of conductive material.

41. The fingerprint sensor system of claim 26, further comprising a plurality of substantially parallel ground reference lines oriented substantially in-line with the plurality of drive lines and connected to ground, wherein each ground reference line crosses the reference pickup line.

42. The fingerprint sensor system of claim 41, wherein the ground reference lines are connected to ground by vias to a ground layer.

43. The fingerprint sensor system of claim 26, wherein the plurality of drive lines are oriented substantially perpendicular to the plurality of pickup lines.

44. The fingerprint sensor system of claim 26, wherein the compensation drive line is located outside a finger contact area defined by crossing drive lines and pickup lines.

45. The fingerprint sensor system of claim 26, wherein the reference pickup line is located outside the finger contact area.

46. The fingerprint sensor system of claim 26, wherein the system further comprises:
  a ground layer having a first and a second cutout, wherein the compensation drive line is located within the first cutout and the reference pickup drive line is located within the second cutout;
  a second insulating layer separating the ground layer from the plurality of drive lines;
  an interconnect layer;
  a third insulating layer separating the interconnect layer from the ground layer;
  a plurality of pickup interconnect elements located in the interconnect layer and crossing the compensation drive line, wherein the pickup interconnect elements are connected to the plurality of pickup element by vias, and wherein the crossing of the pickup interconnect elements and the compensation drive line provides the capacitive coupling of the pickup lines with the compensation drive line; and
  a reference pickup interconnect element located in the interconnect layer and crossing the compensation drive line and the reference pickup drive line, wherein the reference pickup interconnect element is connected to the reference pickup line by a via, and wherein the crossing of the reference pickup interconnect element and the compensation drive line provides the capacitive coupling of the reference pickup line with the compensation drive line, and the crossing of the reference pickup interconnect element and the reference pickup drive line provides the capacitive coupling of the reference pickup line with the reference pickup drive line.

* * * * *

UNITED STATES PATENT AND TRADEMARK OFFICE
CERTIFICATE OF CORRECTION

PATENT NO. : 9,779,280 B2
APPLICATION NO. : 14/582359
DATED : October 3, 2017
INVENTOR(S) : Fred G. Benkley, III et al.

It is certified that error appears in the above-identified patent and that said Letters Patent is hereby corrected as shown below:

In the Specification

Column 10, Line 12: "width of the drive element" should be -- width of the reference drive element --

Column 11, Line 18: delete "reference drive"

Column 13, Line 45: "302" should be -- 301 --

Column 15, Line 32: "drive oscillator" should be -- signal source --

Column 17, Line 24: delete "signal source" after "to a"

In the Claims

Column 19, Line 54: "claim 1" should be -- claim 17 --

Column 19, Line 59: delete "at"

Column 20, Line 4: "element" should be -- lines --

Column 21, Line 45: "second width is twice the first width" should be -- first width is twice the second width --

Column 22, Line 27: "claim 26" should be -- claim 44 --

Column 22, Line 44: "element" should be -- lines --

Signed and Sealed this
Tenth Day of April, 2018

Andrei Iancu
*Director of the United States Patent and Trademark Office*